(12) United States Patent
Gontovnik et al.

(10) Patent No.: US 10,459,526 B2
(45) Date of Patent: Oct. 29, 2019

(54) SYSTEMS AND METHODS FOR GESTURE HANDLING IN A THREE-DIMENSIONAL VISUAL SCENE

(71) Applicant: Facebook, Inc., Menlo Park, CA (US)

(72) Inventors: Danil Gontovnik, London (GB); Yu Hang Ng, London (GB); Siarhei Hanchar, London (GB); Michael Slater, Nottingham (GB); Sergei Viktorovich Anpilov, London (GB)

(73) Assignee: Facebook, Inc., Menlo Park, CA (US)

( * ) Notice: Subject to any disclaimer, the term of this patent is extended or adjusted under 35 U.S.C. 154(b) by 218 days.

(21) Appl. No.: 15/648,031

(22) Filed: Jul. 12, 2017

(65) Prior Publication Data

US 2019/0018494 A1   Jan. 17, 2019

(51) Int. Cl.
*G06F 3/01* (2006.01)
*G06F 3/0488* (2013.01)
*G02B 27/00* (2006.01)
*G02B 27/01* (2006.01)
*G06F 3/00* (2006.01)

(52) U.S. Cl.
CPC ............. *G06F 3/017* (2013.01); *G06F 3/011* (2013.01); *G06F 3/04883* (2013.01); *G02B 27/00* (2013.01); *G02B 2027/0138* (2013.01); *G06F 3/00* (2013.01)

(58) Field of Classification Search
CPC ...... G02B 2027/0138; G02B 2027/014; G06F 3/00; G06F 3/011; G06F 3/017; G06F 3/1438; G06F 3/012; G06F 3/013; G06F 3/016; G06K 9/00221; G06K 9/00624; G06T 19/00; G06T 19/006; G09G 2340/12

See application file for complete search history.

(56) References Cited

U.S. PATENT DOCUMENTS

| | | | |
|---|---|---|---|
| 2014/0129990 A1* | 5/2014 | Xin | G06F 3/017 715/849 |
| 2015/0288933 A1* | 10/2015 | Iversen | G06F 3/147 348/14.07 |
| 2016/0026253 A1* | 1/2016 | Bradski | G02B 27/225 345/8 |
| 2016/0274786 A1* | 9/2016 | Hernandez | G06F 3/017 |
| 2017/0017386 A1* | 1/2017 | Mattson | G06F 16/957 |

* cited by examiner

*Primary Examiner* — David Duffy
*Assistant Examiner* — Ankit B Doshi
(74) *Attorney, Agent, or Firm* — Baker Botts L.L.P.

(57) ABSTRACT

In one embodiment, a method includes displaying, on a client system, a visual scene with one or more first objects and one or more second objects. The one or more second objects are associated with an augmented reality context. A first touch event handler, associated with an operating system running on the client system, may receive a set of touch events and send the set of touch events to a second touch event handler running on the client system. The second touch event handler may detect a first subset of touch events relating to the one or more second objects. The second touch event handler may process the first subset of touch events and send a second subset of touch events relating to the one or more first objects to the first touch event handler. The first touch event handler may process the second subset of touch events.

20 Claims, 5 Drawing Sheets

SYSTEMS AND METHODS FOR GESTURE HANDLING IN A THREE-DIMENSIONAL VISUAL SCENE

TECHNICAL FIELD

This disclosure generally relates to gesture handling of objects, and more particularly to systems and methods for handling touch events on objects in a three-dimensional (3D) visual scene.

BACKGROUND

Augmented reality provides a view of the real or physical world with added computer-generated sensory inputs (e.g., visual, audible). In other words, computer-generated virtual effects augment or supplement the real-world view. For example, a mobile phone with a camera may capture a real-world scene (as an image or video) and display a composite of the captured scene with computer-generated objects. The virtual objects may be, for example, two-dimensional and/or three-dimensional objects, and it may be stationary or animated. The virtual objects may be configured to be conceptually positioned anywhere within the captured scene. For example, from the perspective of a viewer, a virtual object may be positioned behind or in front of an object in the scene (e.g., a tree, a person, etc.). When the virtual object appears in front of the object in the scene, the virtual object in effect covers a portion of that object. Thus, the covered portion may not be visible to the viewer. In certain circumstances, a user who created an image/video with augmented-reality effects may have intended for the covered portion of the underlying image/video to be concealed.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user. One user may also send images and videos to other users of the social-networking system, such as those who are directly or indirectly connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touch screens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a standard touch handler, associated with an operating system running on a client system, may be integrated with a custom three-dimensional (3D) touch handler, associated with an application running on the client system, for handling a variety of touch events received on a visual scene rendered on a display screen of the client system (e.g., a mobile device). The two touch handlers may work together to handle received touch events intended for different targets/objects in the visual scene. For instance, the custom 3D touch handler may process touch events relating to 3D objects in an asynchronous manner, and the standard OS touch handler may process touch events that are intended for system-level-user-interface objects or objects that are part of or integrated into the visual scene in a synchronous manner. 3D objects (referred to herein as overlaid objects) may be objects overlaid on top of a real-world scene indicating information about the scene such as in an augmented reality (AR) environment. For example, a user may be capturing a photo/video using his mobile device and one or more objects may be overlaid on top of the photo/video to provide decorative/entertaining effects or indicate information regarding a scene being captured by the device's camera. In this example, when the user touches on the one or more overlaid objects, the touches may be handled by the custom 3D touch handler while the touches on any other portions (e.g., tap to focus the camera) may be handled by the standard touch handler. One reason for the integration of the two systems is that the main thread associated with the OS may become unresponsive and laggy when processing the touches on the 3D objects because the OS has to do a redraw in the 3D graphics to process the touches. The main thread of the OS may be blocked until it receives a response. With the integration of the two handlers discussed herein, touch events relating to specific 3D objects (e.g., 3D objects associated with an AR context) may be handled asynchronously by the custom 3D touch handler without blocking the main thread of the system and hence avoiding any delay in the response time. In addition, the embodiments covered in this application address an issue unique to AR scenes, where a system-level user interface (e.g., that of the camera) is integrated with a 3D engine's user interface so that a user can interact with both the system-level features (e.g., camera focusing) and features associated with the rendered 3D objects.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In particular embodiments, a standard touch handler, associated with an operating system running on a client system, may be integrated with a custom three-dimensional (3D) touch handler, associated with an application running on the client system, for handling a variety of touch events received on a visual scene rendered on a display screen of the client system (e.g., a mobile device). The two touch handlers may work together to handle received touch events intended for different targets/objects in the visual scene. For instance, the custom 3D touch handler may process touch events relating to 3D objects in an asynchronous manner, and the standard OS touch handler may process touch events that are intended for system-level-user-interface objects or objects that are part of or integrated into the visual scene in a synchronous manner. 3D objects (referred to herein as overlaid objects) may be objects overlaid on top of a real-world scene indicating information about the scene such as in an augmented reality (AR) environment. For example, a user may be capturing a photo/video using his mobile device and one or more objects may be overlaid on top of the photo/video to provide decorative/entertaining effects or indicate information regarding a scene being captured by the device's camera (as shown for example in FIG. 2B). In this example, when the user touches on the one or more overlaid objects, the touches may be handled by the custom 3D touch handler while the touches on any other portions (e.g., tap to focus the camera) may be handled by the standard touch handler. One reason for the integration of the two systems is that the main thread associated with the OS may become very unresponsive and laggy when processing the touches on the 3D objects because the OS has to do a redraw in the 3D graphics to process the touches. The main thread of the OS may be blocked until it receives a response. With the integration of the two handlers discussed herein, touch events relating to specific 3D objects (e.g., 3D objects associated with an AR context) may be handled asynchronously by the custom 3D touch handler without blocking the main thread of the system and hence avoiding any delay in the response time. In addition, the embodiments covered in this application address an issue unique to AR scenes, where a system-level user interface (e.g., that of the camera) is integrated with a 3D engine's user interface so that a user can interact with both the system-level features (e.g., camera focusing) and features associated with the rendered 3D objects.

Figure 1:
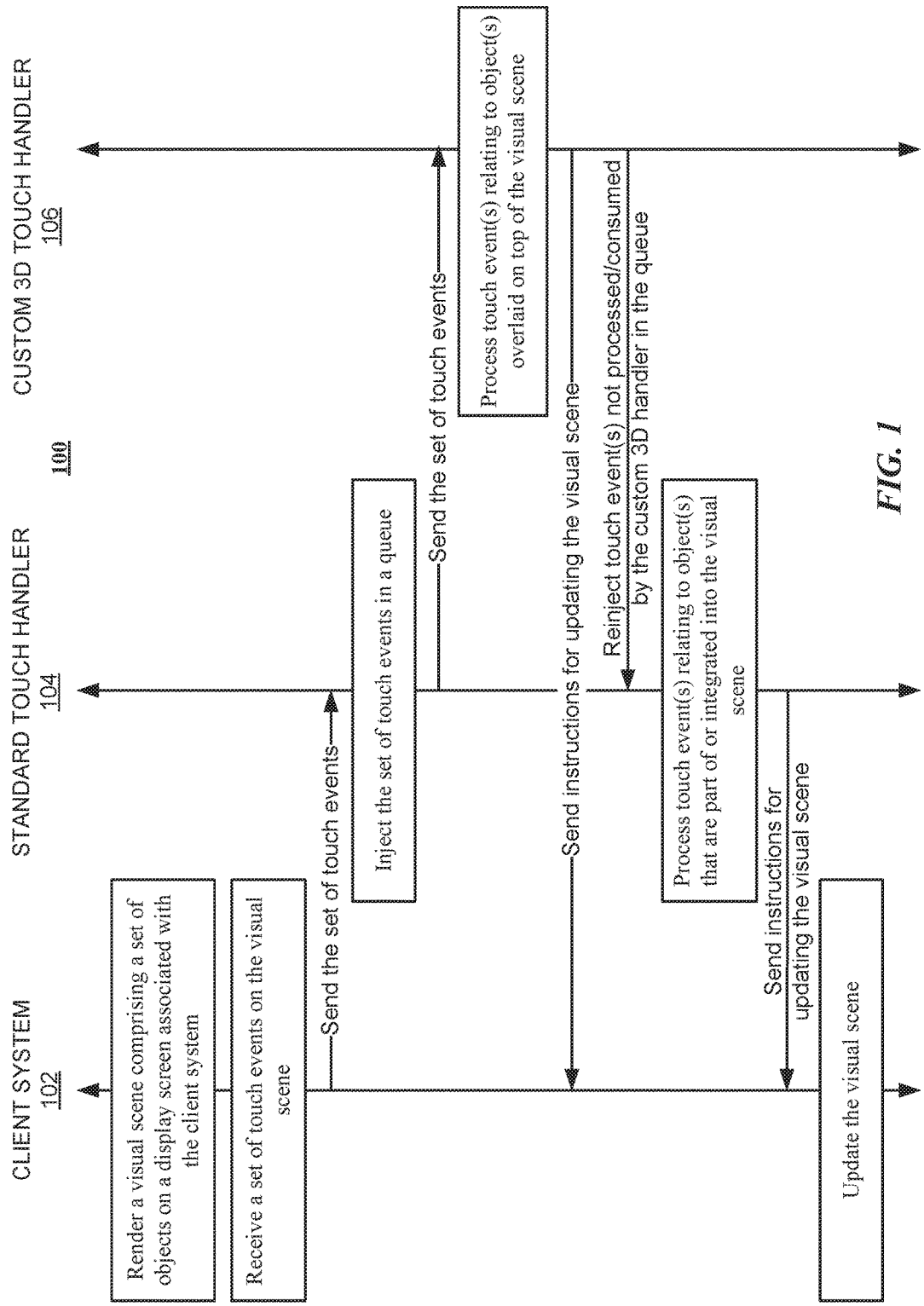
FIG. 1 is an example interaction diagram illustrating interaction between various entities associated with embodiments discussed herein.
Figure 2A:
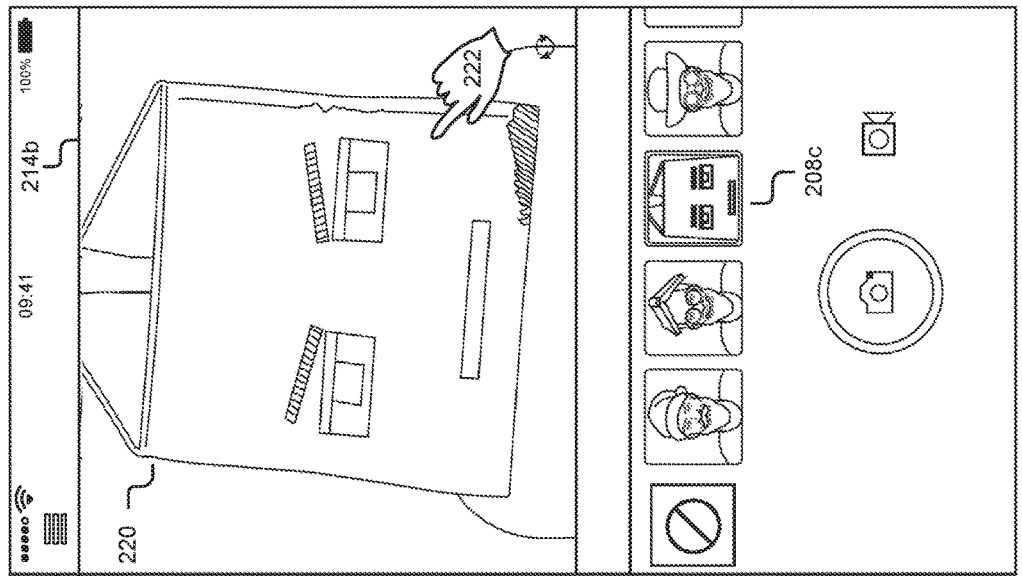
FIGS. 2A and 2B illustrate examples of a graphical user interface comprising a visual scene and one or more overlaid objects that may be rendered on top of the visual scene to provide an augmented reality effect to a user.
Figure 2B:
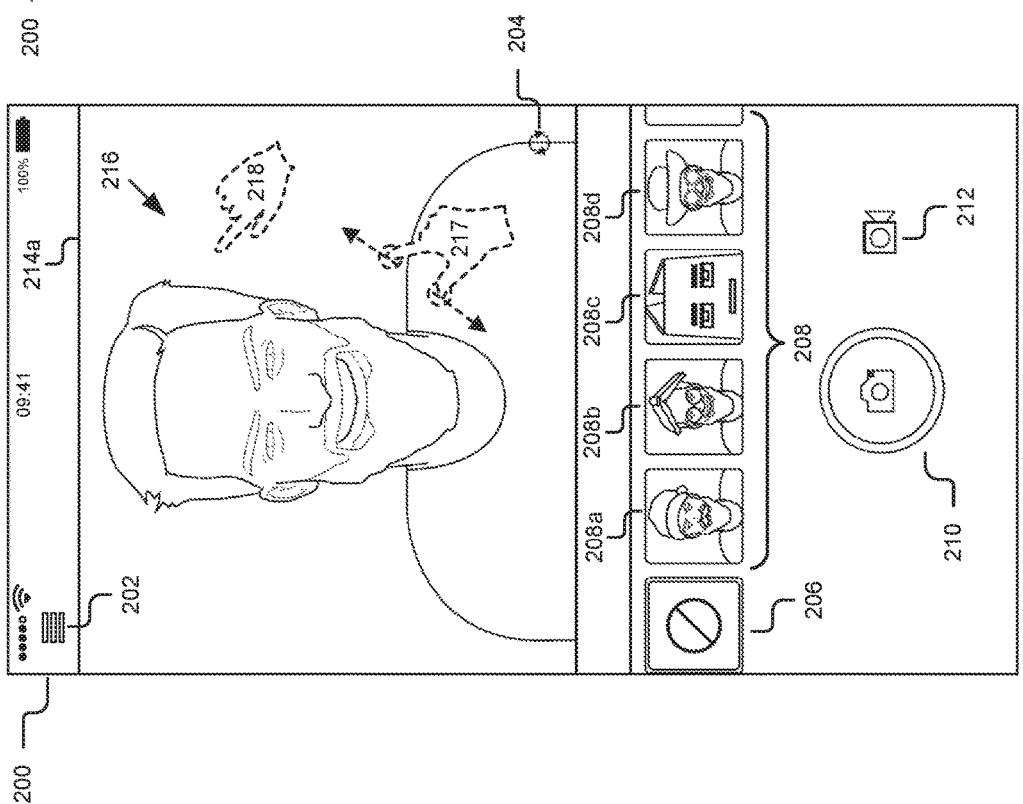

FIG. 1 is an example interaction diagram 100 illustrating interaction between various entities associated with embodiments discussed herein. As depicted, a client system 102 may render a visual scene to a user on a display screen associated with the client system 102. In particular embodiments, the visual scene may be provided by an application running on the client system 102. The visual scene may include a set of objects, some of which may be part of or integrated into the scene itself and some may be overlaid on top of the visual scene (aka overlaid objects) to provide an augmented reality (AR) effect to a user. For example, a visual scene may be a selfie of the user with a mask overlaid on top of the user's face, displayed through a user interface, as shown in FIG. 2B. In some embodiments, the client system 102 discussed herein is the same as a client system 430 that has been discussed in reference to FIG. 4.

Responsive to displaying the visual scene, the client system 102 may receive a set of touch events/inputs from the user. Non-limiting examples of the touch events/input that may be received by the user may include a tap gesture, a drag gesture, a touch-up gesture, a touch-down gesture, a pinch-to-zoom gesture, a swipe gesture, inputs through a pointing or any other input device, etc. The display of the client system 102 may be a touch-screen display capable of receiving input from one or more fingers of the user. For example, the display may be a capacitive touch-screen display capable of detecting and interpreting multiple points of contact with the display surface. The touch-screen display of the client system 102 may be managed by a touch controller, which may relay and/or pass the received inputs/signals to one or more components associated with the client system 102, such as the standard touch handler 104 or the custom 3D touch handler 106.

In some embodiments, a series of touch events may be received by the client system 102 that may be intended for the visual scene (which may include, e.g., a container object for displaying the scene, such as a window or frame object) or the overlaid objects on the visual scene, or both. For instance, a first subset of the touch events may correspond to the visual scene while a second subset of the touch events may correspond to the overlaid objects on the visual scene. In some embodiments, a single touch event/input may be received on the display screen that may correspond to either the visual scene or the overlaid object on the visual scene. As an example and not by way of limitation, FIG. 2A shows a pinch-to-zoom gesture 217 performed by a user on a visual scene 216. FIG. 2B shows a tap gesture 222 performed by a user on an overlaid object 220 in the visual scene 216.

In particular embodiments, the set of touch events received on the visual scene (including overlaid objects) may be forwarded to a standard touch handler 104. For example, a touch controller associated with a touch-screen display of the client system 102 may receive the set of touch events and send them to the standard touch handler 104 for processing. The standard touch handler 104 may be associated with the operating system that is running on the client system 102. For example, the standard touch handler 104 may be an iOS touch handling system, an android touch handling system, a windows touch handling system, etc. The standard touch handler 104 may be configured to process touch events/inputs that are intended for system-level-interface objects or objects that are part of or integrated into the visual scene, as discussed elsewhere herein. As an example and not by way of limitation, the standard touch handler 104 may process a pinch-to-zoom gesture for zooming in a user displayed within a visual scene (as shown in FIG. 2A). As another example in reference to FIG. 2A, if the user performs a tap gesture anywhere within the visual scene to focus the camera or increase the brightness, then that tap gesture may be processed by the standard touch handler 104. In particular embodiments, the standard touch handler 104 may be a synchronous handler configured to process a series of tasks in a synchronous manner (e.g., without any halt in its execution). For example, when a set of touch events/inputs is received by the standard touch handler 104, the handler 104 may consume it by detecting that the events/inputs may be intended for, e.g., a running AR application and forward the set of events to the application's custom 3D handler 106. The custom 3D handler 106 may send a subset of these events back to the standard touch handler 104 when, e.g., the custom 3D handler 106 determines that it cannot or is not intended to consume those events. As a result, the standard touch handler 104 may receive the touch events or a subset of these touch events from the custom 3D handler 106 for processing, and responsive to processing the touch events, update a visual scene for display. Although FIG. 1 depicts the set of touch events as being sent to the standard touch handler 104 for processing, it should be noted that this is not limiting and the touch events may be sent directly to the custom 3D touch handler 106 for processing.

In particular embodiments, responsive to receiving the set of touch events, the standard touch handler 104 may store the received events in a queue. The standard touch handler 104 may store the touch events in the queue as they are received. The queue may be a data structure that is capable of storing and providing access to data. The standard touch handler 104 may be able to manipulate, e.g., store, query, update, and/or delete, data stored in the queue using programmatic operations. In particular embodiments, the standard touch handler 104 may analyze the touch events for information and store the information along with the events in the queue. For example, the standard touch handler 104 may determine, for each touch event/gesture, X-Y coordinates where the gesture is performed, type of gesture that has been performed, intensity with which the gesture is performed, etc. The standard touch handler 104 may store this information for each event in the queue. Once the events are stored in the queue, the standard touch handler 104 may make an asynchronous call to the custom 3D handler 106 and pass the set of touch events that it has received to the custom 3D handler 106.

The custom 3D touch handler 106 may be a touch handler associated with an application configured to generate complex 3D scenes, such as a scene involving AR effects. For example, the application may be an AR related camera application for overlaying one or more objects (aka overlaid objects) on top of a real-world scene captured by a camera of a client system, and the application may have its own touch handler (i.e., the custom 3D touch handler 106) for handling touch events relating to these overlaid objects. The custom 3D touch handler 106 may be configured to process the touch events in an asynchronous manner (e.g., not processing all the events in series and processing only those events that are intended for overlaid objects on a visual scene).

When the custom 3D touch handler 106 receives the touch events from the standard touch handler 104, the custom 3D touch handler 106 may store these events in its own queue. This queue may be a data structure that is capable of storing and providing access to data similar to the queue associated with the standard touch handler 104. A ray casting technique may be applied to determine which objects the user has interacted within the visual scene. In particular, the ray casting technique may be applied to determine if any 3D objects or particularly overlaid objects have been interacted by the user in the visual scene. If a 3D object (or more particularly an overlaid object) has been interacted by the user, then the touch event for this 3D object may be consumed and processed by the custom 3D touch handler 106. For example, with reference to FIG. 2B, when a user taps on the mask 220 that is overlaid on top of the user's face, then that tap may be consumed and/or processed by the custom 3D touch handler 106. In some embodiments, the custom 3D touch handler 106 may make a call to an appropriate JavaScript responsible for handling the AR effect associated with a touch event on an overlaid object. Once an event for an overlaid object has been processed, the custom 3D touch handler 106 may provide instructions to a 3D rendering engine associated with the application for updating the visual scene. The 3D rendering engine may send instructions to a graphical processing unit (GPU) associated with the client system 102 for updating the visual scene and presenting the updated visual scene to the user.

In certain embodiments, the set of touch events received from the standard touch handler 104 may not be related to overlaid objects (or relating to AR context) and may simply be related to the visual scene itself (e.g., a tap to focus the camera or a tap to increase the brightness). This may be determined using the ray casting technique, as discussed above. For example, when a user performs a tap gesture within a frame/window comprising a visual scene with overlaid objects, the ray casting may indicate that the user's tap is not on an overlaid object in the visual scene but rather just a tap on an area within the visual scene to focus the camera. For example, the user's tap input may have occurred at coordinates (X,Y). In particular embodiments, ray casting or similar techniques may be used to trace a trajectory of the user's input through the displayed virtual 3D space to see whether the trajectory would intersect with an overlaid object generated by the 3D rendering engine. If the user's tap input intersects with an overlaid object, the 3D touch handler 106 may proceed to consume the corresponding touch events. On the other hand, if the user's input does not intersect with any overlaid objects, the touch handler 106 may determine that it is not the intended or suitable handler for the touch event. In such scenario, the touch events would not be consumed by the custom 3D touch handler 106 and the custom 3D touch handler 106 may reinject these events back into the queue associated with the standard touch handler 104 for processing. In some embodiments, the events may be reinjected at the same locations or in the same order in the queue in which they were originally received. In some embodiments, if a touch event is not consumed by the custom 3D touch handler 106, then the custom 3D handler 106 may create a copy of the event and inject into the queue for handling by the standard OS handler 104. For example, if the custom 3D touch handler 106 receives a touch-to-zoom event but realized that this event was not meant for an overlaid object, then the custom 3D touch handler 106 would recreate a new touch-to-zoom event and give it back to the standard touch handler 104 for processing. Recreating an event may depend on the type of operating system (OS) with which the two handlers 104 and 106 are associated. For example, creating a copy of an event (or a new event) and then passing it to the standard touch handler 104 may be required for certain operating system, whereas for other operating systems the original event may be required.

When the standard touch handler 104 receives one or more touch events (e.g., events that are not processed/consumed) from the custom 3D touch handler 106, the standard touch handler 104 may begin processing one or more touch events relating to the visual scene. For example, a touch event may be a tap gesture within a visual scene rendered by a camera application to focus the camera or a touch event may be a pinch-to-zoom gesture to zoom in user(s) captured using the camera. These type of touch events may be consumed and/or processed by the standard touch handler 104. Once an event has been processed, the standard touch handler 104 may send instructions to a rendering engine associated with the operating system for updating the visual scene (e.g., zoom in). The rendering engine may further send instructions to a graphical processing unit (GPU) associated with the client system 102 for updating the visual scene and presenting the updated visual scene to the user.

In some embodiments, there may be a single queue associated with the standard touch handler 104 and the custom 3D touch handler 106. For instance, the standard touch hander 104 may store the set of events in a queue and send the queue to the custom 3D touch handler 106 for processing. The custom 3D touch handler 106 may traverse the queue to process touch events relating to the overlaid objects. The custom 3D handler 106 may reinject touch events that are not processed/consumed by it in the queue, and then send the queue back to the standard touch handler 104 for it to process the remaining touch events. In certain embodiments, when passing back the queue to the standard touch handler 104, the custom 3D touch handler 106 may set a status for each touch event stored in the queue. The status associated with an event may indicate whether that particular event has been consumed/not consumed by the custom 3D handler 106. Using the status, the standard touch handler 104 may efficiently process only those events that are intended to be processed by the standard touch handler 104.

Although the above paragraphs describe the standard touch handler 104 as being configured to process touch events relating to a visual scene (e.g., touch events relating to objects that are part of or integrated into the scene) and the custom 3D handler 106 as being configured to process touch events relating to 3D or overlaid objects on the visual scene, it should be noted that the two handlers 104 and 106 are not limited to their respective configurations and other configurations are also possible and within the scope of the present disclosure. For example, the standard touch handler 104 may be configured to handle any feature supported by the system, such as, e.g., touch events relating to only two-dimensional (2D) objects while the custom 3D handler 106 may be configured to handle application-specific features such as touch events relating to 3D objects in a visual scene generated by the application. As another example, the standard touch handler 104 may be configured to handle touch events relating to simple 3D effects (e.g., giving a text a 3D spin; manipulating an image along the X, Y, and Z planes; changing positions and scaling of objects; adding animations or shadow effects, etc.) while the custom 3D handler 106 may be configured to handle touch events relating to complex 3D effects, such as the virtual reality or augmented reality effects.

FIGS. 2A-2B illustrate examples of a graphical user interface 200 comprising a visual scene and one or more overlaid objects that may be rendered on top of the visual scene to provide an augmented reality effect to a user. In particular, FIG. 2A illustrates an interface 200 associated with an AR relating camera application that offers a variety of augmented reality masks 208 from which the user can choose a desired mask to apply to a face and capture an image or a video with the overlaid mask. The interface 200 may be rendered on a client system 102 of a user. For example, the interface 200 may be rendered on a touch-screen display of a mobile device. As depicted, the interface 200 includes a set of interface elements 202-212 that when interacted performs a specific function. For instance, interface element 202 is a drop-down menu that when interacted offers a variety of options to the user; interface element 204 is a camera flip button that when interacted activates either the front or the back camera of the mobile device; interface element 206 is a no-mask/original-picture option that when interacted allows a user to take a picture/video without any masks; interface elements 208a-208d (collectively referred to herein as 208) are different AR mask options from which the user can choose a desired mask option and apply to a face shown within the display frame 214a; interface element 210 is a camera button that when interacted activates a camera mode to capture an image; and interface element 212 is a video button that when interacted records a video. These interface elements 202-212 may be interacted by the user via touch gestures.

As depicted, the interface 200 includes a display frame 214a within which a visual scene 216 may be rendered. Here, the visual scene 216 shows a selfie of a user. In the depicted embodiment, there are no objects that are overlaid on top of this visual scene 216. When the user performs a touch gesture anywhere within the display frame 214a or on the visual scene 216, then the touch gesture may be processed by the standard touch handler 104. For example, when the user performs a pinch-to-zoom gesture 217 on the visual scene 216, then the standard touch handler 104, through the process described above, may process the gesture 217 and updates the display frame 214a, in cooperation with a rendering engine, to present a zoomed-in image of the user. As another example, when the user performs a tap gesture 218 on the visual scene 216 to focus the camera or increase the brightness, then this tap gesture 218 may be handled by the standard touch handler 104, through the process described above. When one or more objects are overlaid on top of the visual scene 216, a touch event on an overlaid object may be received by the standard touch handler 104 but its processing/handling may be done by the custom 3D handler, as discussed below in reference to at least FIG. 2B.

FIG. 2B illustrates the graphical user interface 200 with an updated display frame 214b showing an example overlaid object on top of the visual scene 216 of FIG. 2A. Specifically, FIG. 2B shows a cardboard mask 220 that has been overlaid on top of the user's face in response to the user selecting the mask option 208c. The user may interact with the overlaid cardboard mask 220, via touch gestures, to activate it to perform one or more actions. For example, the user may perform a tap gesture 222 on the overlaid mask 220 to change the face expressions or open/close the cardboard. The tap gesture 222 on the overlaid mask 220 may be handled/processed by the custom 3D touch handler, as discussed elsewhere herein. For instance, the tap gesture 222 may be received by the custom 3D handler 106 from the standard OS touch handler 104, and the custom 3D handler 106 may process the gesture and send instructions to a 3D rendering engine associated with the application to present an updated display.

Figure 3:
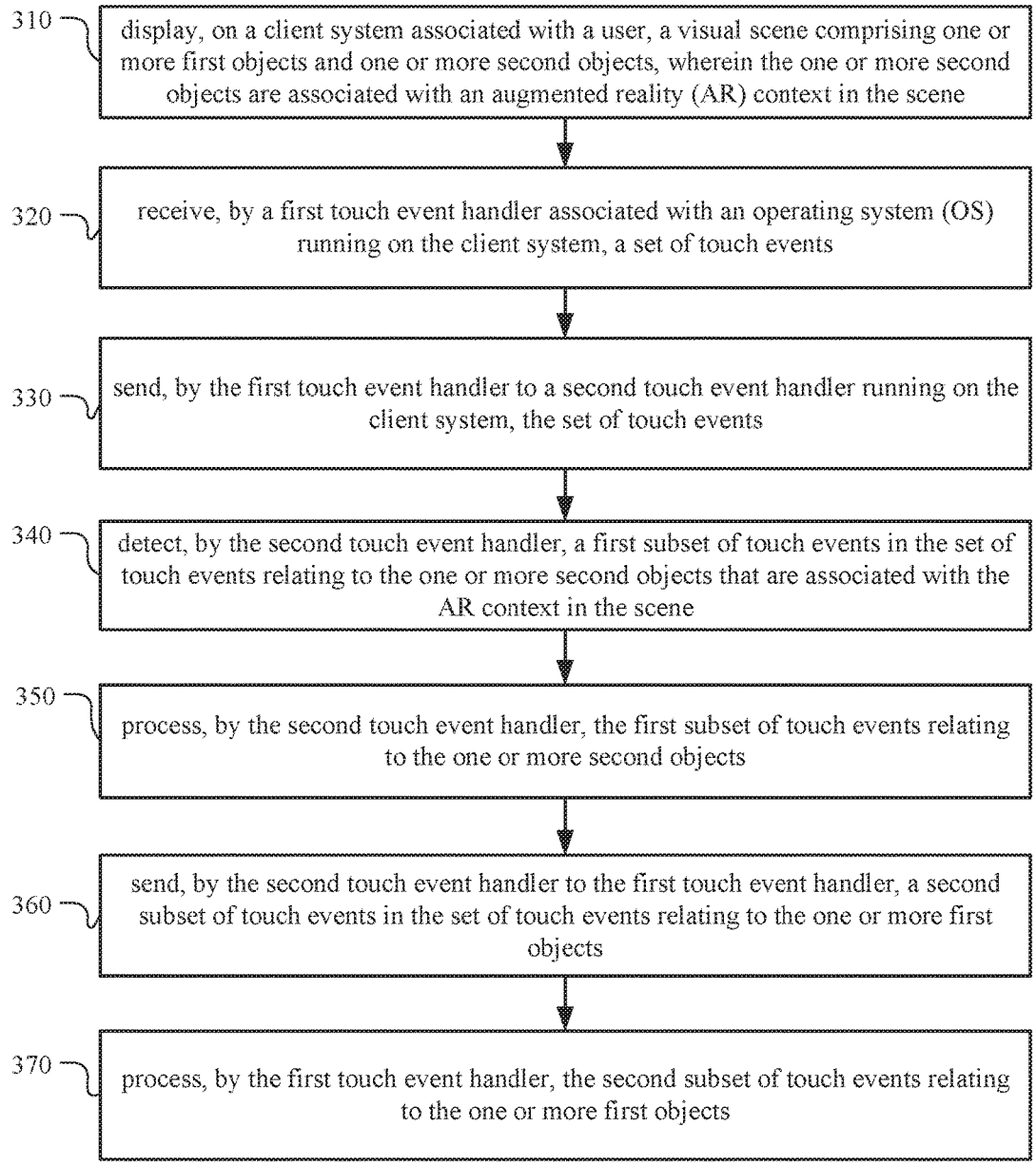
FIG. 3 is a flowchart of an example method for processing a set of touch events received on a three-dimensional visual scene.

FIG. 3 is a flowchart of an example method 300 for processing a set of touch events received on a three-dimensional visual scene. The method may begin at step 310, where a visual scene comprising one or more first objects and one or more second objects may be displayed on a client system 102/430 associated with a user. The one or more first objects may be objects that are part of or integrated into the visual scene (e.g., the window or frame in which the scene is displayed). The one or more second objects may be associated with an augmented reality (AR) context in the scene. For example, the one or more second objects may be three-dimensional (3D) objects (defined within a virtual 3D space) that are overlaid on top of the visual scene to provide decorative/entertaining effects (e.g., as shown and discussed in reference to FIG. 2B). At step 320, a set of touch events may be received by a first touch event handler associated with an operating system (OS) running on the client system 102/430. The first touch event handler may be the standard touch handler 104, as discussed elsewhere herein. The set of touch events may comprise one or more of a tap gesture, a drag gesture, a touch-up gesture, a touch-down gesture, a pinch-to-zoom gesture, or a swipe gesture. At step 330, the first touch event handler may send, to a second touch event handler running on the client system 102/430, the set of touch events. The second touch event handler may be associated with an application configured to generate the AR context. For example, the second touch event handler may be the custom 3D touch handler 106, as discussed elsewhere herein. At step 340, the second touch event handler may detect a first subset of touch events in the set of touch events relating to the one or more second objects that are associated with the AR context in the scene. In particular embodiments, detection of the first subset of touch events relating to the one or more second objects may be performed using a ray casting technique. At step 350, the second touch event handler may process the first subset of touch events relating to the one or more second objects. The second touch event handler may process the first subset of touch events asynchronously. At step 360, the second touch event handler may send, to the first touch event handler, a second subset of touch events in the set of touch events relating to the one or more first objects. At step 370, the first touch event handler may process the second subset of touch events relating to the one or more first objects. The first touch event handler may process the second subset of touch events synchronously. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for processing a set of touch events received on a three-dimensional visual scene including the particular steps of the method of FIG. 3, this disclosure contemplates any suitable method for processing a set of touch events received on a three-dimensional visual scene, including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
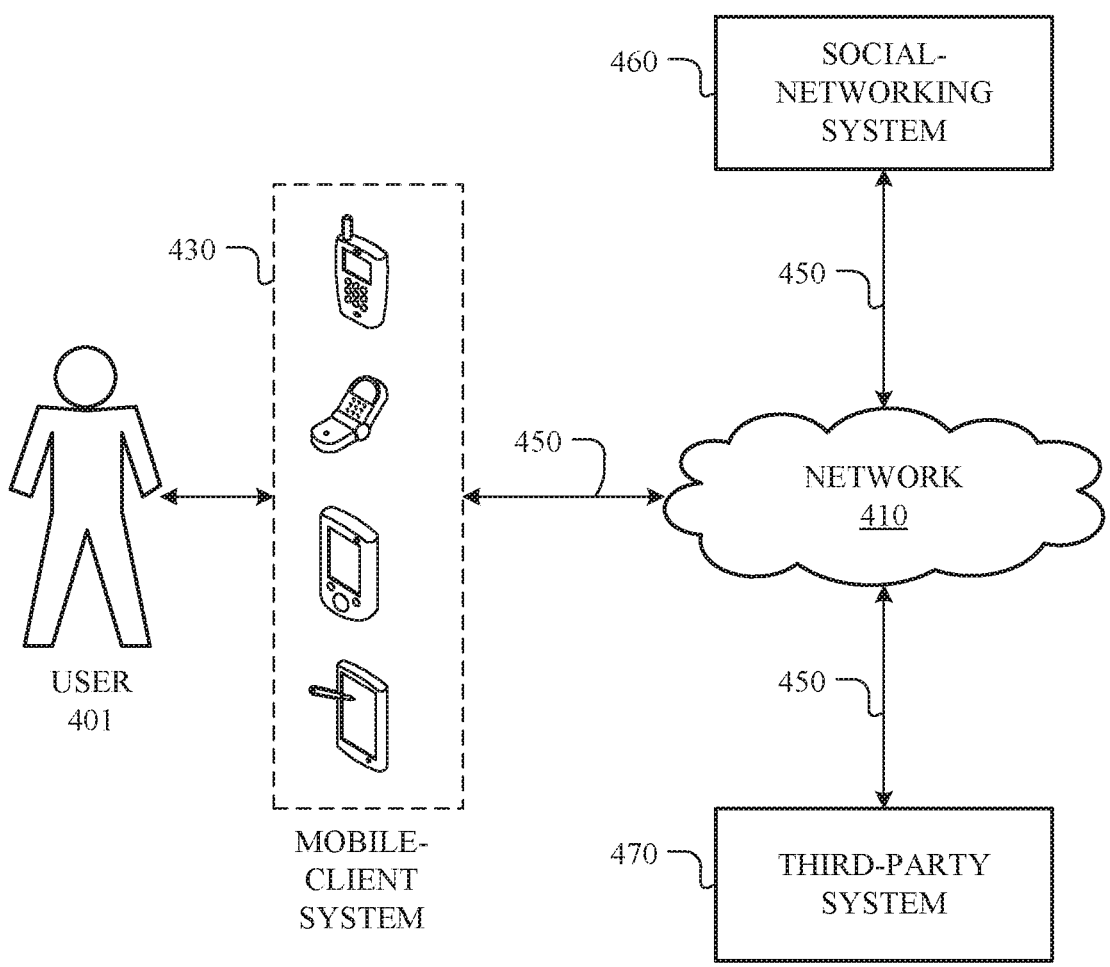
FIG. 4 illustrates an example network environment associated with a social-networking system.

FIG. 4 illustrates an example network environment 400 associated with a social-networking system. Network environment 400 includes a user 401, a client system 430, a social-networking system 460, and a third-party system 470 connected to each other by a network 410. Although FIG. 4 illustrates a particular arrangement of user 401, client system 430, social-networking system 460, third-party system 470, and network 410, this disclosure contemplates any suitable arrangement of user 401, client system 430, social-networking system 460, third-party system 470, and network 410. As an example and not by way of limitation, two or more of client system 430, social-networking system 460, and third-party system 470 may be connected to each other directly, bypassing network 410. As another example, two or more of client system 430, social-networking system 460, and third-party system 470 may be physically or logically co-located with each other in whole or in part. Moreover, although FIG. 4 illustrates a particular number of users 401, client systems 430, social-networking systems 460, third-party systems 470, and networks 410, this disclosure contemplates any suitable number of users 401, client systems 430, social-networking systems 460, third-party systems 470, and networks 410. As an example and not by way of limitation, network environment 400 may include multiple users 401, client system 430, social-networking systems 460, third-party systems 470, and networks 410.

In particular embodiments, user 401 may be an individual (human user), an entity (e.g., an enterprise, business, or third-party application), or a group (e.g., of individuals or entities) that interacts or communicates with or over social-networking system 460. In particular embodiments, social-networking system 460 may be a network-addressable computing system hosting an online social network. Social-networking system 460 may generate, store, receive, and send social-networking data, such as, for example, user-profile data, concept-profile data, social-graph information, or other suitable data related to the online social network. Social-networking system 460 may be accessed by the other components of network environment 400 either directly or via network 410. In particular embodiments, social-networking system 460 may include an authorization server (or other suitable component(s)) that allows users 401 to opt in to or opt out of having their actions logged by social-networking system 460 or shared with other systems (e.g., third-party systems 470), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. Third-party system 470 may be accessed by the other components of network environment 400 either directly or via network 410. In particular embodiments, one or more users 401 may use one or more client systems 430 to access, send data to, and receive data from social-networking system 460 or third-party system 470. Client system 430 may access social-networking system 460 or third-party system 470 directly, via network 410, or via a third-party system. As an example and not by way of limitation, client system 430 may access third-party system 470 via social-networking system 460. Client system 430 may be any suitable computing device, such as, for example, a personal computer, a laptop computer, a cellular telephone, a smartphone, a tablet computer, or an augmented/virtual reality device.

This disclosure contemplates any suitable network 410. As an example and not by way of limitation, one or more portions of network 410 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 410 may include one or more networks 410.

Links 450 may connect client system 430, social-networking system 460, and third-party system 470 to communication network 410 or to each other. This disclosure contemplates any suitable links 450. In particular embodiments, one or more links 450 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 450 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 450, or a combination of two or more such links 450. Links 450 need not necessarily be the same throughout network environment 400. One or more first links 450 may differ in one or more respects from one or more second links 450.

Figure 5:
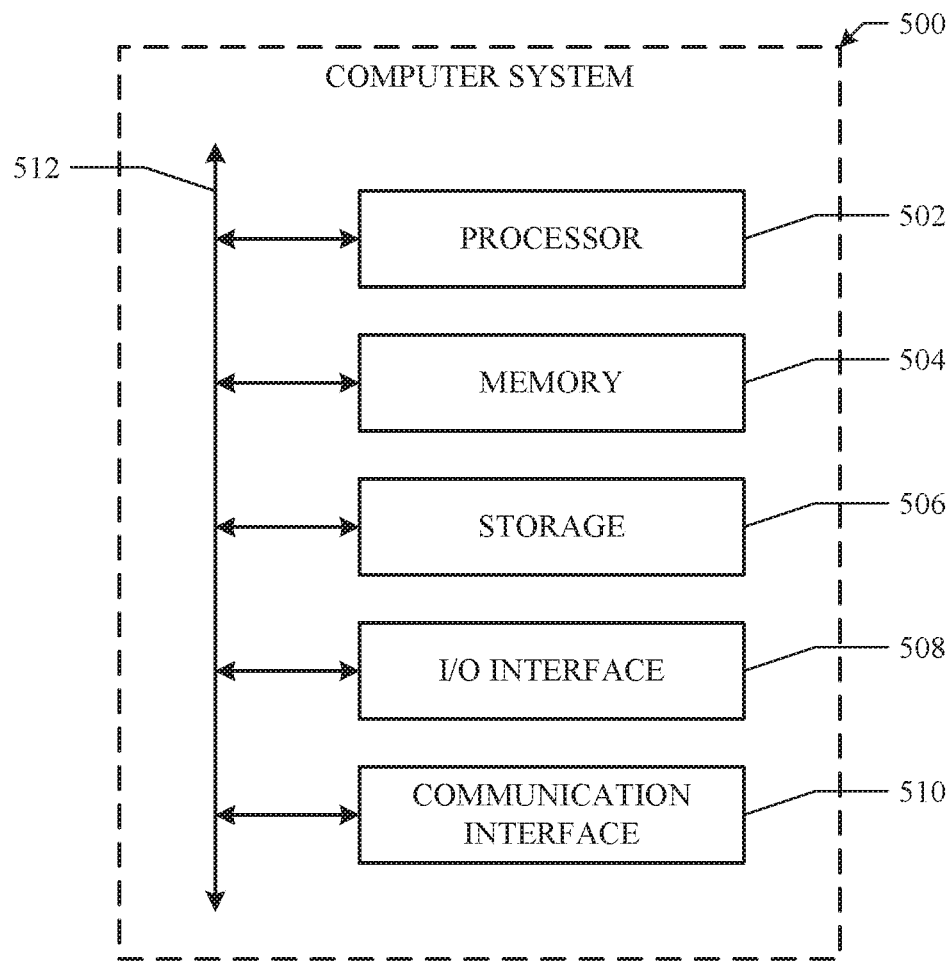
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    displaying, on a client system associated with a user, a visual scene comprising one or more first objects and one or more second objects, wherein the one or more second objects are associated with an augmented reality (AR) context in the scene;
    receiving, by a first touch event handler associated with an operating system (OS) running on the client system, a set of touch events;
    sending, by the first touch event handler to a second touch event handler running on the client system, the set of touch events;
    detecting, by the second touch event handler, a first subset of touch events in the set of touch events relating to the one or more second objects that are associated with the AR context in the scene;
    processing, by the second touch event handler, the first subset of touch events relating to the one or more second objects;
    sending, by the second touch event handler to the first touch event handler, a second subset of touch events in the set of touch events relating to the one or more first objects;
    processing, by the first touch event handler, the second subset of touch events relating to the one or more first objects;
    sending, to the client system associated with the user, instructions for updating the visual scene in response to the processing of the first subset of touch events or the processing of the second subset of touch events; and
    updating, on the client system associated with the user, the visual scene for display in response to receiving the instructions.

2. The method of claim 1, wherein processing of the second subset of touch events relating to the one or more first objects by the first touch event handler is done synchronously.

3. The method of claim 2, wherein the first touch event handler is an OS touch event handler.

4. The method of claim 1, wherein processing of the first subset of touch events relating to the one or more second objects by the second touch event handler is done asynchronously.

5. The method of claim 4, wherein the second touch event handler is associated with an application configured to generate the AR context.

6. The method of claim 1, wherein the detecting of the first subset of touch events relating to the one or more second objects is performed using a ray casting technique.

7. The method of claim 1, wherein the one or more second objects are three-dimensional (3D) objects that are overlaid on top of a real-world scene captured by a camera of the client system.

8. The method of claim 1, wherein the one or more first objects are system-level user interface objects.

9. The method of claim 1, wherein the set of touch events comprises one or more of a tap gesture, a drag gesture, a touch-up gesture to scroll upwards, a touch-down gesture to scroll downwards, a pinch-to-zoom gesture, or a swipe gesture.

10. The method of claim 1, wherein the sending of the set of touch events to the second touch event handler comprises:
    injecting, by the first touch event handler, the set of touch events and information associated with each touch event in a data structure.

11. The method of claim 10, wherein the information associated with a touch event in the data structure comprises position or location coordinates where the touch event is performed and type of gesture associated with the touch event.

12. The method of claim 10, wherein the sending of the second subset of touch events to the first touch event handler comprises:
    re-injecting the second subset of touch events that are not processed or consumed by the second touch event handler into the data structure.

13. The method of claim 12, wherein re-injecting the second subset of touch events that are not processed or consumed by the second touch event handler comprises:
    re-creating the second subset of touch events for processing by the first touch event handler.

14. The method of claim 13, wherein re-injecting the second subset of touch events that are not processed or consumed by the second touch event handler comprises:
    determining to re-create the second subset of touch events based on a type of the OS running on the client system.

15. One or more computer-readable non-transitory storage media embodying software that is operable when executed to:
    display, on a client system associated with a user, a visual scene comprising one or more first objects and one or more second objects, wherein the one or more second objects are associated with an augmented reality (AR) context in the scene;

receive, by a first touch event handler associated with an operating system (OS) running on the client system, a set of touch events;

send, by the first touch event handler to a second touch event handler running on the client system, the set of touch events;

detect, by the second touch event handler, a first subset of touch events in the set of touch events relating to the one or more second objects that are associated with the AR context in the scene;

process, by the second touch event handler, the first subset of touch events relating to the one or more second objects;

send, by the second touch event handler to the first touch event handler, a second subset of touch events in the set of touch events relating to the one or more first objects;

process, by the first touch event handler, the second subset of touch events relating to the one or more first objects;

send, to the client system associated with the user, instructions for updating the visual scene in response to the processing of the first subset of touch events or the processing of the second subset of touch events; and update, on the client system associated with the user, the visual scene for display in response to receiving the instructions.

16. The media of claim 15, wherein the first touch event handler is an OS touch event handler that is configured to process the second subset of touch events synchronously.

17. The media of claim 15, wherein the second touch event handler is associated with an application configured to generate the AR context, and wherein the second touch event handler is configured to process the first subset of touch events asynchronously.

18. A system comprising: one or more processors; and a non-transitory memory coupled to the processors comprising instructions executable by the processors, the processors operable when executing the instructions to:

display, on a client system associated with a user, a visual scene comprising one or more first objects and one or more second objects, wherein the one or more second objects are associated with an augmented reality (AR) context in the scene;

receive, by a first touch event handler associated with an operating system (OS) running on the client system, a set of touch events;

send, by the first touch event handler to a second touch event handler running on the client system, the set of touch events;

detect, by the second touch event handler, a first subset of touch events in the set of touch events relating to the one or more second objects that are associated with the AR context in the scene;

process, by the second touch event handler, the first subset of the touch events relating to the one or more second objects;

send, by the second touch event handler to the first touch event handler, a second subset of touch events in the set of touch events relating to the one or more first objects;

process, by the first touch event handler, the second subset of touch events relating to the one or more first objects;

send, to the client system associated with the user, instructions for updating the visual scene in response to the processing of the first subset of touch events or the processing of the second subset of touch events; and update, on the client system associated with the user, the visual scene for display in response to receiving the instructions.

19. The system of claim 18, wherein the first touch event handler is an OS touch event handler that is configured to process the second subset of touch events synchronously.

20. The system of claim 18, wherein the second touch event handler is associated with an application configured to generate the AR context, and wherein the second touch event handler is configured to process the first subset of touch events asynchronously.

* * * * *